UNITED STATES PATENT OFFICE.

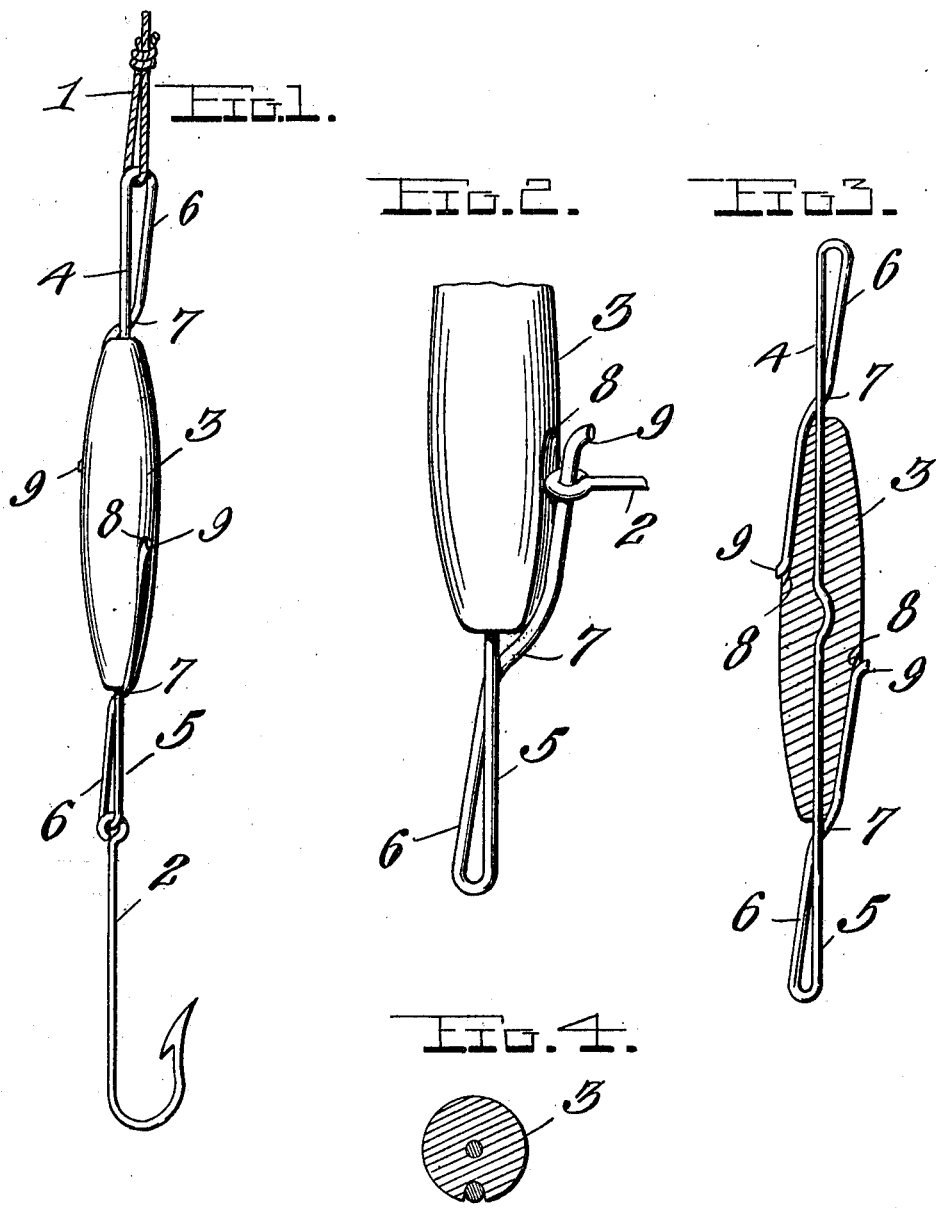

GEORGE M. VAUGHN, OF CHAUTAUQUA, KANSAS.

SINKER.

978,519.   Specification of Letters Patent.   Patented Dec. 13, 1910.

Application filed June 22, 1910. Serial No. 568,330.

*To all whom it may concern:*

Be it known that I, GEORGE M. VAUGHN, a citizen of the United States, residing at Chautauqua, in the county of Chautauqua and State of Kansas, have invented certain new and useful Improvements in Sinkers, of which the following is a specification, reference being had to the accompanying drawings.

My invention relates to improvements in fishing tackle, and more particularly to a sinker which may be readily applied to and removed from a fishing line and to which a fishing hook may be quickly and easily applied and as readily removed.

The object of the invention is to provide a simple and practical device of this character which will be strong and durable, inexpensive, and well adapted for the purpose intended.

With the above and other objects in view, the invention consists of the novel features of construction and the combination and arrangements of parts hereinafter fully described and claimed and illustrated in the accompanying drawings in which—

Figure 1 is a perspective view of my improved sinked showing a line and hook applied thereto. Fig. 2 is a side elevation showing the manner in which the hook is applied. Fig. 3 is a longitudinal section, and Fig. 4 is a transverse section.

In the drawings, 1 denotes a fishing line, 2 a fishing hook, and 3 my improved sinker, which is adapted to connect said parts, and which is so constructed that they may be instantly applied or removed without the necessity of untying or tying knots. The body of the sinker may be of any form and construction, but as illustrated it has tapered ends from which project similar spring hooks or clips 4, 5 preferably formed by the ends of a single piece of resilient wire which has its intermediate portion extending through and embedded in the body of the sinker. The spring hooks or clips 4, 5 are similar in construction, but are turned in opposite directions to balance the device, the upper one 4, being adapted to engage a loop formed on the line 1, while the lower one 5, is adapted to engage the usual eye on the hook. Each of the spring clips is formed by bending the projecting end of the wire upon itself as shown at 6, to form a loop or hook, and the end or bill of such hook has its intermediate portion off-set as shown at 7, while its inner or free end portion is adapted to seat in a longitudinal groove 8 formed in the sinker body, the grooves 8 being on opposite sides of the opposite ends of the body, owing to the disposition of the spring clips or hooks. The grooves or seats 8 are of sufficient depth to receive the free ends of the bills of the spring hooks or clips, but in order to permit said portions to be readily removed from the grooves during the application or removal of the hook or line, the extremities of the bills of the spring hooks project slightly beyond the outer surface of the body of the sinker as shown at 9, to permit the finger nail, or the loop on the fishing line, or the eye on the fishing hook to be readily engaged with the same, when it is desired to apply the line or hook.

In use, it will be seen that a fishing hook may be instantly applied to or removed from one of the spring hooks or clips by simply slipping the eye of the fishing hook on to or off of the clip, thereby rendering it unnecessary to tie the hook to the line or sinker, or fasten it by other devices. Likewise, the sinker may be quickly and easily applied to or removed from the fishing line.

This construction, it will be noted is exceedingly advantageous since it enables the fishing hook or both the fishing hook and sinker to be quickly and easily removed from the line when it is not in use, and also enables the parts to be as readily applied when it is desired to use the line.

I claim:

1. A fishing tackle element comprising a body having a wire extending therethrough, the said wire being provided at its ends with spring hooks which cross and close against said wire at points near the ends of the said body and terminate in bills which close against the said body.

2. A sinker comprising a body provided at opposite sides of its opposite ends with longitudinally extending seats, a resilient wire having its intermediate portion extending through and embedded in the body of the sinker, and its end portions bent upon themselves to provide resilient hooks or clips for engagement with a line and a fish hook, the bills of said spring hooks or clips being off-set intermediate their ends and turned in opposite directions, and the free or inner portions of said bills being arranged in said longitudinal seats in the sinker body, and having out-turned extremities projecting slightly beyond the outer surface of the sinker body.

3. A fishing tackle element comprising a body having a wire extending therethrough, the said wire being provided at its ends with spring hooks which cross and close against said wire at points near the ends of the said body and terminate in bills which close against said body, the said body being provided with seats for the reception of the said bills.

In testimony whereof I hereunto affix my signature in the presence of two witnesses.

GEORGE M. VAUGHN.

Witnesses:
ALLEN SCOTT,
F. E. SIPPLE.